J. MAYES.

Improvement in Churns.

No. 126,725. Patented May 14, 1872.

Witnesses:
P. C. Dieterich
Geo. W. Mabee

Inventor:
J. Mayes
PER
Attorneys.

No. 126,725

UNITED STATES PATENT OFFICE.

JOSIAH MAYES, OF OXFORD, NEW YORK.

IMPROVEMENT IN CHURNS.

Specification forming part of Letters Patent No. 126,725, dated May 14, 1872.

Specification describing a new and useful Improvement in Friction Attachment for Dasher-Churns, invented by JOSIAH MAYES, of Oxford, in the county of Chenango and State of New York.

Figure 1:
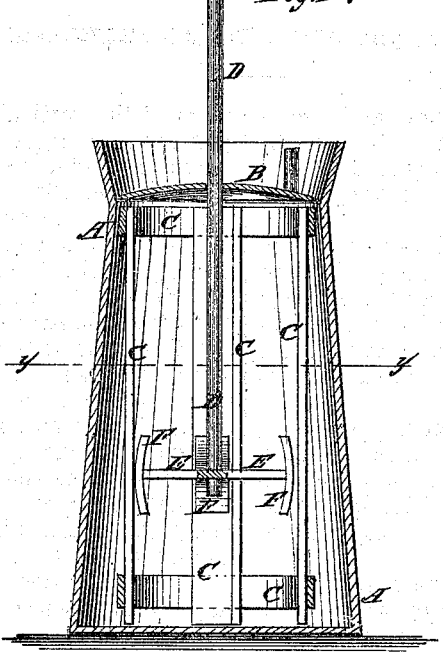
Figure 2:
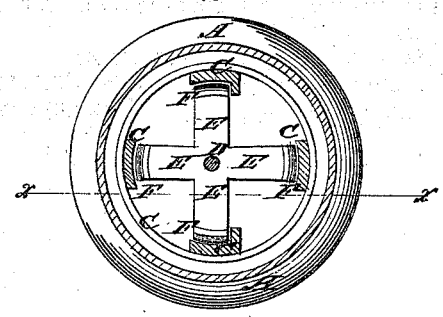

Figure 1 is a detail vertical section of my improved friction attachment taken through the line $x\ x$, Fig. 2, and shown as applied to a churn. Fig. 2 is a detail horizontal section of the same taken through the line $y\ y$, Fig. 1.

Similar letters of reference indicate corresponding parts.

My invention pertains to an improvement in the class of reciprocating churns provided with guides for the dasher; and it consists in the combination of shoes or friction-plates with the dasher and vertical guides, as hereinafter described.

A represents the body of a churn, and B the cover, about the construction of which parts there is nothing new. C is a frame-work, which may be made of wood or metal, as may be desired. The frame C consists of four, more or less, vertical bars, connected and held in their proper position by hoops at their upper and lower ends, as shown in Figs. 1 and 2. The frame C is made of such a size that it may be conveniently inserted and removed from the churn A, when required. One, two, or more of the vertical bars of the frame C are made with flanges upon their side edges to serve as guides to the dasher in its up-and-down movement. D is the dasher-handle, which passes through a hole in the center of the cover B, and to its lower end is attached the dasher E. To the outer ends of the arms or blades of the dasher E are attached shoes F, to slide along the vertical bars of the frame C. The ends of the shoes F are bent inward slightly, as shown in Figs. 1 and 2, so that they cannot catch upon the frame C as they are sliding up and down.

By this device a friction will be obtained, which, in connection with the agitation caused by the dasher, will bring the butter in a very short time, and will develop all the butter there may be in the milk.

Having thus described my invention, I claim as new and desire to secure by Letters Patent—

The combination of the shoes F with the dasher E to adapt it for use with the friction-frame C, substantially as herein shown and described, and for the purpose set forth.

JOSIAH MAYES.

Witnesses:
  O. H. CURTIS,
  W. E. CHAPMAN.